(12) United States Patent
Kim et al.

(10) Patent No.: US 8,588,859 B2
(45) Date of Patent: Nov. 19, 2013

(54) METHOD FOR CONTROLLING COMMUNICATION SETTING OF MOBILE TERMINAL AND MOBILE TERMINAL THEREOF

(75) Inventors: Hee Deog Kim, Gyeonggi-do (KR); Jun Sung Kim, Gyeongsangbuk-do (KR); Tae Hoon Shin, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 112 days.

(21) Appl. No.: 13/206,824

(22) Filed: Aug. 10, 2011

(65) Prior Publication Data

US 2012/0040724 A1    Feb. 16, 2012

(30) Foreign Application Priority Data

Aug. 14, 2010    (KR) .................. 10-2010-0078555

(51) Int. Cl.
    *H04B 1/38*    (2006.01)
(52) U.S. Cl.
    USPC ........ 455/566; 455/550.1; 715/835; 715/814; 715/864; 715/700

(58) Field of Classification Search
    USPC ........ 455/566, 550.1; 715/835, 814, 864, 700
    See application file for complete search history.

(56) References Cited

U.S. PATENT DOCUMENTS

| | | | |
|---|---|---|---|
| 2007/0038934 A1* | 2/2007 | Fellman | 715/700 |
| 2007/0101297 A1* | 5/2007 | Forstall et al. | 715/841 |
| 2008/0215998 A1 | 9/2008 | Moore et al. | |
| 2010/0325207 A1* | 12/2010 | Churchill et al. | 709/204 |

FOREIGN PATENT DOCUMENTS

EP    1253796 A1    10/2002

* cited by examiner

*Primary Examiner* — Sanh Phu
(74) *Attorney, Agent, or Firm* — Cha & Reiter, LLC

(57) ABSTRACT

A method for controlling communication setting of a mobile terminal, includes: outputting a communication setting widget indicating an operational state of at least one data communication function associated with the mobile terminal; receiving a signal for changing the operational state, the signal being associated with at least a part of the outputted communication setting widget and changing the operational state of at least one of the at least one data communication functions according to the signal.

21 Claims, 7 Drawing Sheets

METHOD FOR CONTROLLING COMMUNICATION SETTING OF MOBILE TERMINAL AND MOBILE TERMINAL THEREOF

CLAIM OF PRIORITY

This application claims, pursuant to 35 USC 119, priority to, and the benefit of the earlier filing date of, that patent application filed in the Korean Patent Office on Aug. 14, 2010 and afforded serial number 10-2010-0078555, the contents of which are incorporated by reference, herein.

BACKGROUND OF THE INVENTION

1. Field of the Invention

The present invention relates to mobile terminals and more particular to a method for controlling communication setting of a mobile terminal.

2. Description of the Related Art

With the continued development to converge multiple technologies, today's mobile terminals support a variety of functions. For example, today's mobile terminals may perform operations associated video phone calling, an electronic note function, and an Internet function in addition to a conventional voice call and a short message transmission function. Further, today's mobile terminals use upgraded hardware and software to support these additional functions.

In addition, with the ever-expanding development of communication technology, the conventional mobile terminal supports multiple data communication schemes. For example, the conventional mobile terminal may support data communication based on 3G/4G networks and data communication based on Wi-Fi networks. However, communication schemes supported by the conventional mobile terminal have different data billing methods and characteristics. The data communication scheme based on the Wi-Fi network may use data transmission and reception free of charge but has a limitation with regard to an available zone or communication range. The data communication scheme based on 3G (4G) network has few limitations with regard to an available zone but there are associated fees based on the amount of data that is transmitted and received. In particular, the data communication scheme based on the 3G (4G) network supports a function of periodically transmitting and receiving data based on a background processing scheme according to settings of a mobile terminal.

However, in a state that the various functions are supported, users are interested in frequently used terminal functions. Accordingly, the users may not easily know an indirectly used function, particularly, a communication setting state of a mobile terminal by the users.

Further, when the conventional mobile terminal user attempts to know the communication setting state, the user may be required to perform a lengthy searching procedure to search for the desired information. Therefore, although the user wants to control the mobile terminal to have a certain communication setting state, the user may not be provided the necessary information to perform procedures that are involved.

SUMMARY OF THE INVENTION

The present invention has been made in view of the above problems, and provides a method for determining and controlling the operation states of data communication protocols in order to provide a user with the means to selectively control the wireless operational state(s) of a mobile device.

In accordance with an aspect of the present invention, method, operable by a processor in a mobile terminal, for controlling communication setting of the mobile terminal is disclosed, the method comprising outputting a communication setting widget indicating an operational state of at least one data communication function of the mobile terminal, receiving a signal for changing an operational state of at least one of the at least one data communication function, wherein the signal is associated with a part of the communication setting widget and changing the operational state of the corresponding data communication function according to the received signal.

In another aspect of the invention, a mobile terminal supporting communication setting state control is disclosed. The terminal comprises a radio frequency unit forming a communication channel for data communication and forming a communication channel to support a data communication service access allowed state and an automatic synchronizing function, a display unit outputting a communication setting widget for changing the data communication service access state, and automatic synchronizing function state, wherein the service access state is selected from the group consisting of: allowed state and impossible state, and the synchronization function state is selected from the group consisting of: active state and inactive state and a controller controlling the change of at least one of the data communication service access setting states and the automatic synchronizing function states in response to a signal associated with the communication widget.

BRIEF DESCRIPTION OF THE DRAWINGS

The above features and advantages of the present invention will be more apparent from the following detailed description in conjunction with the accompanying drawings, in which.

DETAILED DESCRIPTION OF THE INVENTION

Embodiments of the present invention are described with reference to the accompanying drawings in detail. The same reference numbers are used throughout the drawings to refer to the same or like parts. For the purposes of clarity and simplicity, detailed descriptions of well-known functions and structures incorporated herein may be omitted to avoid obscuring the subject matter of the present invention.

Figure 1:
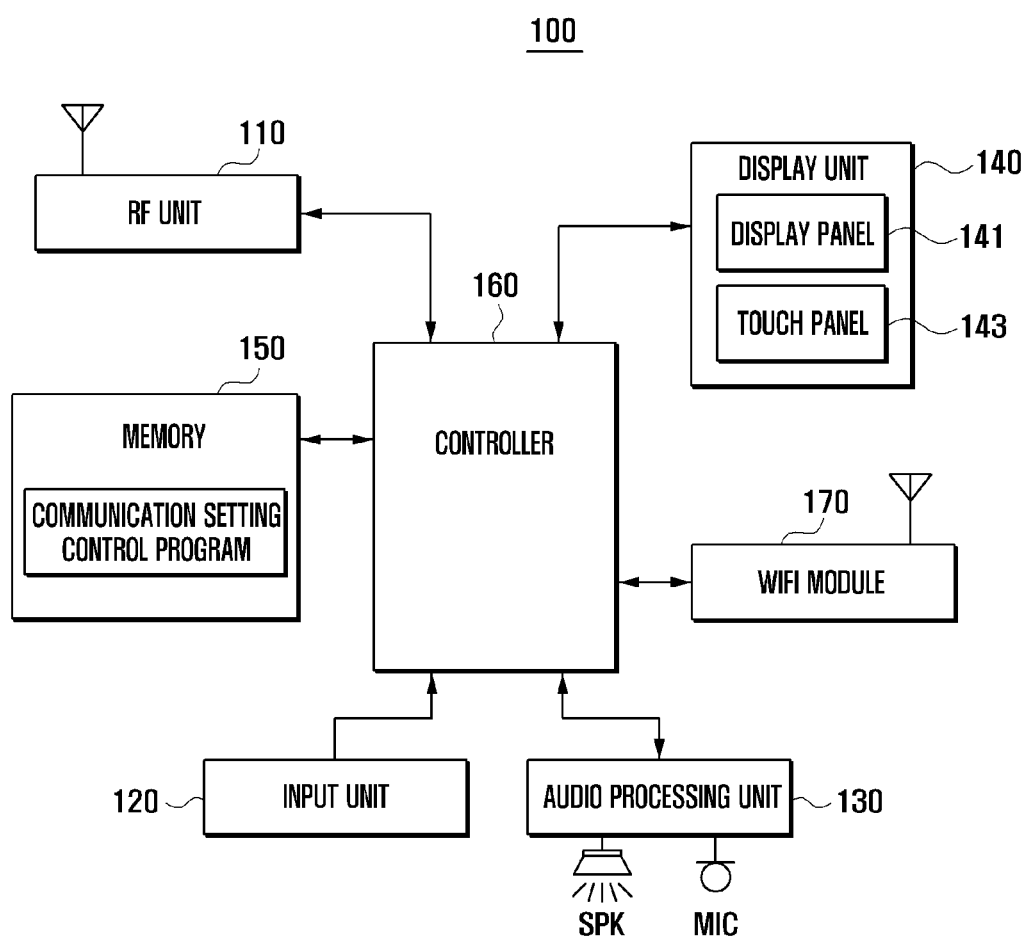
FIG. 1 is a block diagram illustrating a configuration of a mobile terminal according to an exemplary embodiment of the present invention.

FIG. 1 is a block diagram showing partial constructions of a mobile terminal associated with an embodiment of the present invention.

Referring to FIG. 1, a mobile terminal 100 includes a radio frequency (RF) unit 110, an input unit 120, an audio processing unit 130, a display unit 140, a memory 150, a controller 160, and a Wi-Fi module 170. Although illustrated, it would be recognized that the Wi-Fi module 170 is an optional feature of many mobile terminals and may be omitted according to characteristics of a mobile terminal 100 without altering the scope of the invention.

The illustrated mobile terminal 100 may access a server using the RF unit 110 to transmit and receive data to and from the server (not shown). The mobile terminal 100 may output to the display unit 140 a communication setting widget capable of checking and changing communication setting based on the RF unit 110. In this case, the user may simply change a communication setting state of the mobile terminal 100 based on the communication setting widget output on the display unit 140 and easily determine a current communication setting state of the mobile terminal 100.

In addition, the server may include a server connecting with a network and provides access to the interne and/or a mobile communication enterpriser server for supporting Multi-Media Message Service (MMS).

Further, the communication setting widget may provide an indication of a data communication operational state of the mobile terminal 100. The communication setting widget may change a current state of a data communication function accessing a server according to generation of an input signal to transmit and receive data and a current state of an automatic synchronizing function transmitting and receiving data to and from a server at predetermined periods. In this case, the communication setting widget may provide a text or an image such that a user may recognize the data communication function setting state and the automatic synchronizing function setting state. The image may be a sign corresponding to each function in a corresponding widget icon, Hereinafter, respective constructions of the mobile terminal 100 will be described in detail.

The RF unit 110 provides support for forming a communication channel for a voice call, or a communication channel for a videophone call, or a communication channel for transmitting data, such as images or messages with other mobile terminals under the control of the controller 160. The RF unit 110 may include a transmitter (not shown) up-converting a frequency of a transmitted signal and amplifying the signal, a receiver (not shown) low-noise-amplifying a received signal and down-converting the signal. The RF unit 110 may receive data from another terminal through the formed channel or transmit certain data to another terminal according to user control. Further, the RF unit 110 may receive various data (analog or digital) from an exterior according to user control and transmit the data to the memory 150 under the control of the controller 160. In particular, the RF unit 110 may form a communication channel with a certain server under the control of the controller 160 and perform data transmission and reception with the certain server. The RF unit 110 chiefly supports two functions associated with data communication. That is, when the user creates an input signal requesting access with the certain server, the RF unit 110 may form a communication channel with a server according to the input signal and then support a data communication function capable of transmitting and receiving data over the formed communication channel.

Further, the RF unit 110 may automatically transmit a packet requesting data to a certain server in a predetermined period, and support an automatic synchronizing function receiving a necessary data packet from a corresponding server. A data communication function according to the data communication access allowed state may be performed in a foreground processing scheme. The automatic synchronizing function may be performed in a background processing scheme. The foregoing two functions may determine a communication setting state for presence of availability by a communication setting widget to be described below, and a corresponding setting state may be expressed by a communication setting widget.

Meanwhile, the RF unit 110 may form a communication channel with a 3G network for supporting data communication. Here, the automatic synchronizing function is a function periodically transmitting and receiving data to and from a certain server based on the RF unit 110, and includes an address book update function, a schedule update function, and an electronic mail update function. The automatic synchronizing function may automatically access a server providing data corresponding to a function to collect necessary information through a background processing procedure while a user maintains in an active state as illustrated previously. In the meantime, the data communication access allowed state may refer to a state accessing a certain server using a certain network to transmit and receive data according to user control and an MMS transmission and reception possible state.

The input unit 120 receives as input numeral or character information, and includes a plurality of input keys and function keys for setting various types of functions. The function keys may include arrow keys, side keys, and hot keys set to perform certain functions. Further, the input unit 120 generates and transfers a key signal input associated with user setting and function control of the mobile terminal 100 to the controller 160. In particular, the input unit 120 may generate an input signal for selecting a communication setting widget, an input signal for determining a certain communication setting state based on a communication setting widget, and an input signal for controlling a screen interface changing a communication set state according to user input. The foregoing input signals may be substantially generated based on a touch screen. Accordingly, it may be appreciated that the input unit 120 includes the touch screen. When the foregoing input signals are generated, the input unit 120 transfers them to the controller 160.

The audio processing unit 130 includes a speaker (SPK) for playing audio data transmitted or received at the time of the videophone call or the voice call, and a microphone (MIC) fir collecting a user's voice or other audio signals. The audio signals collected by the audio processing unit 130 may be transmitted to another terminal through the RF unit 110. In particular, when a user selects a communication setting widget output on the display unit 140, the audio processing unit 130 of the present invention may output a certain audio signal according to the selection and output a guide sound linked with a corresponding communication setting widget. The guide sound linked with the communication setting widget may become a guide sound corresponding to a current communication setting state of the mobile terminal 100.

The display unit 140 displays information input by a user or information provided to the user as well as various types of menu of the mobile terminal. That is, the display unit 140 may provide various screens such as an idle screen, a menu screen, a message making screen, a call screen, and a mobile terminal booting screen according to utilization of the mobile terminal 100. The display unit 140 may be configured in the form of a flat panel display such as a Liquid Crystal Display (LCD), an Organic Light Emitted Diode (OLED), and a light emitting diode (LED). The display unit 140 may be configured to include a display panel 141 and a touch panel 143. Accordingly, the display unit 140 supporting the touch screen function may support the function of the input unit 120.

The display panel 141 may be displayed at an upper portion or a lower portion of the display unit 140 and may output various screen configuration elements including a communication setting widget. The communication setting widget may be output on the display panel 141 in various forms according to a communication setting state. For example, the communication setting widget may output an image corresponding to at least one of an image corresponding to a possible state of data communication based on a certain network according to a user input, an image corresponding to a cut-off state of data communication based on a certain network according to a user input, an image corresponding to an active state of an automatic synchronizing function transmitting and receiving data to and from a server in a preset period, and an image corresponding to an inactive state of the automatic synchronizing function. Output of the image corresponding to the communication setting widget will be described with reference to accompanying drawings in detail.

The touch panel 143 may be displayed at an upper portion or a lower portion of the display unit 140 and overlay the display unit 141. The touch panel 143 may generate and transfer a touch event to the controller 160 according to a user touch operation. The touch panel 143 may be implemented by various types such as a resistive overlay type or a capacitive overlay type. The touch panel 143 may collect a signal generated according to a pressure applied to a surface or sensing the approach of an object and generate location information of the signal. The collected information is then transferred to the controller 160 to sense which type of a touch event had occurred. In particular, the touch panel 143 may collect and transfer touch events occurring at a location corresponding to the communication setting widget output on the display panel 141 to the controller 160. Accordingly, the controller 160 may change an image of the communication setting widget according to the touch event or output a screen interface for changing a communication setting state on the display panel 141.

The memory 150 stores images of various screen configurations to be output on the display unit 140 as well as application program(s) necessary for performing function(s) or operation(s) according to an embodiment of the present invention. Further, when the display unit 140 is configured as a touch screen, the memory 150 may store information about a key map or a menu map for operating the touch screen, and a touch lock part release region. Here, the key map and the menu map may become various forms, respectively. That is, the key map may become a 3*4 key map, a QWERTY key map, or a control key map for controlling operation of a currently activated application program. Meanwhile, the menu may become a menu map for controlling an operation of a currently activated application program. The memory 150 may chiefly include a program area (not shown) and a data area (not shown).

The program area may store a program controlling an overall operation of the terminal 100, an operating system (OS) booting the terminal 100, an application program necessary for playback of multimedia contents, or other optional functions of the terminal 100 such as a camera function, a sound playing function, or an image or moving image playing function. The data area stores data created according to use of the terminal 100, for example, images, moving images, phone-books, and audio data.

The communication setting control program may include a routine confirming a communication setting state of the mobile terminal, a routine changing a communication setting state according to an input signal, a routine outputting a user interface for changing a communication setting state according to an input signal, a routine determining whether data communication is possible based on a certain communication module, a routine determining whether data communication is possible based on another communication module when the data communication based on the certain communication module is not possible, a routine controlling automatic formation of a data communication channel based on a corresponding communication module when the data communication based on another communication module is possible, a routine checking a data communication constraint state according to the communication setting state, and a routine outputting a certain alarm or a pop-up message according to a data communication constraint state. Here, the certain communication module may be a Wi-Fi module 170 or the RF unit 110. Alternatively, the communication module may be the RF unit 110 or the Wi-Fi module 170. Meanwhile, the communication setting control program may include a routine outputting a communication setting widget on the display unit 140, a routine changing an image form of the communication setting widget according to change in the communication setting state, and a routine outputting a guide message with respect to the communication setting state according to selection of the communication setting widget.

The data area is an area storing data created according to utilization of the mobile terminal 100, and may store at least one icon and various contents according to a widget function. In particular, the data area may store a widget to be output on the display unit 140. For example, an image for a communication setting widget according to an embodiment of the present invention according to an operation of the mobile terminal 100 may be displayed. After the image of the communication setting widget is stored in the data area, it may be output on the display unit 140 under a control of the controller 160 at the time of operating the mobile terminal 100. Here, the data area may store an image distinguishing various communication setting states of the communication setting widget from each other. The image for distinguishing the communication setting states may be substituted by a communication setting widget currently output on the display unit 140 according to change in the communication setting states. In addition, the data area may store guide images with respect to respective communication setting states to output a guide sound according to the communication setting state.

The controller 160 controls power supplied to respective constructions of the mobile terminal to support execution of an initialization procedure of the respective constructions. In particular, the controller 160 may control change of the communication setting state when a certain input signal is generated according to an embodiment of the present invention. Further, the controller 160 may output a communication setting widget according to the communication setting state and change an image of the communication setting widget according to change in the communication setting state. A screen interface for changing the image of the communication setting widget and the communication setting state will be described with reference to a drawing showing an example of a screen to be described later in detail.

When an input signal selecting the communication setting widget is generated, the controller 160 controls the audio processing unit 130 to output a certain audio signal sound and a guide message with respect to a current communication setting state. When the communication setting state changes, in response to an input signal, the controller 160 may output an audio signal sound and/or a guide message corresponding to the changed communication setting state. A configuration of the controller 160 will be described with reference to FIG. 2.

Figure 2:
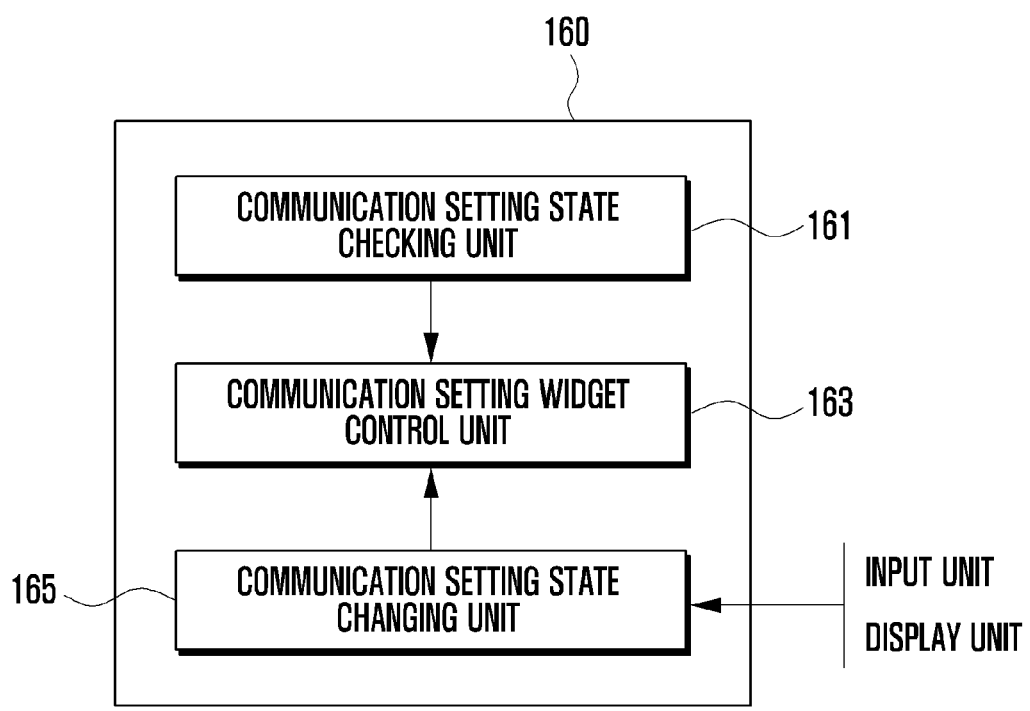
FIG. 2 is a detailed block diagram illustrating a configuration of a controller of FIG. 1.

FIG. 2 is a detailed block diagram illustrating a configuration of a controller of FIG. 1.

Referring to FIG. 2, a controller 160 may include a communication setting state checking unit 161, a communication setting widget control unit 163, and a communication setting state changing unit 165.

The communication setting state checking unit 161 checks a communication setting state associated with a currently set data communication. That is, the communication setting state checking unit 161 checks whether a mobile terminal may perform data communication according to a user input based on a 3G network, for example. The communication setting state checking unit 161 may check whether an automatic synchronizing function is set to an operable state. To do this, the communication setting state checking unit 161 may check communication setting state information that a user has previously set. When the user determines a communication setting state, the controller 160 may store and keep information about the communication setting state in a data area of the memory 150. Accordingly, the communication setting state checking unit 161 may check communication setting state information stored in the data area of the memory 160 at the time of operating the mobile terminal 100 to check communication setting state information that a user set previously. The communication setting state checking unit 161 may transfer information about the state check to the communication setting widget control unit 163.

The communication setting widget control unit 163 may determine an image of a communication setting widget to be output on the display unit 140 based on the communication setting state information received from the communication setting state checking unit 161. To do this, when the communication setting state checking unit 161 transfers the communication setting state information to the communication setting widget control unit 163, the setting widget control unit may read an image corresponding to the communication setting state information from the data area based on the communication setting state information, and output the read image. Further, if an input signal for selecting a communication setting widget output on the display unit 140 is generated, the communication setting widget control unit 163 may transfer the input signal to the communication setting state changing unit 165.

If an input signal for selecting the communication setting widget is generated, the communication setting state changing unit 165 performs an operation for changing a communication setting state based on the input signal. The communication setting state changing unit 165 may control a communication setting state according to generation of the input signal for selecting the communication setting widget to be changed in a toggle scheme according to the intention of a designer. Further, if the communication setting state changes, the communication setting state changing unit 165 may transfer changed information to the communication setting widget control unit 163. Accordingly, the communication setting widget control unit 163 may check an image corresponding to the changed information by referring to the data area, and change an image of the communication setting widget output on the display unit 140 based on the checked image. Meanwhile, if an input signal for selecting a communication setting widget is generated, the communication setting state changing unit 165 may control the display unit 140 to output a user interface for changing the communication setting state. Accordingly, the user may construct a communication setting state using the user interface and determine a desired communication setting state through a confirming procedure. The user interface will be described with reference to FIG. 3 in detail.

As illustrated above, a mobile terminal 100 according to an embodiment of the present invention may output a communication setting widget such that a user may easily recognize various communication setting states with respect to data communication functions of various supported forms, and easily change it to a certain communication setting state.

Figure 3:
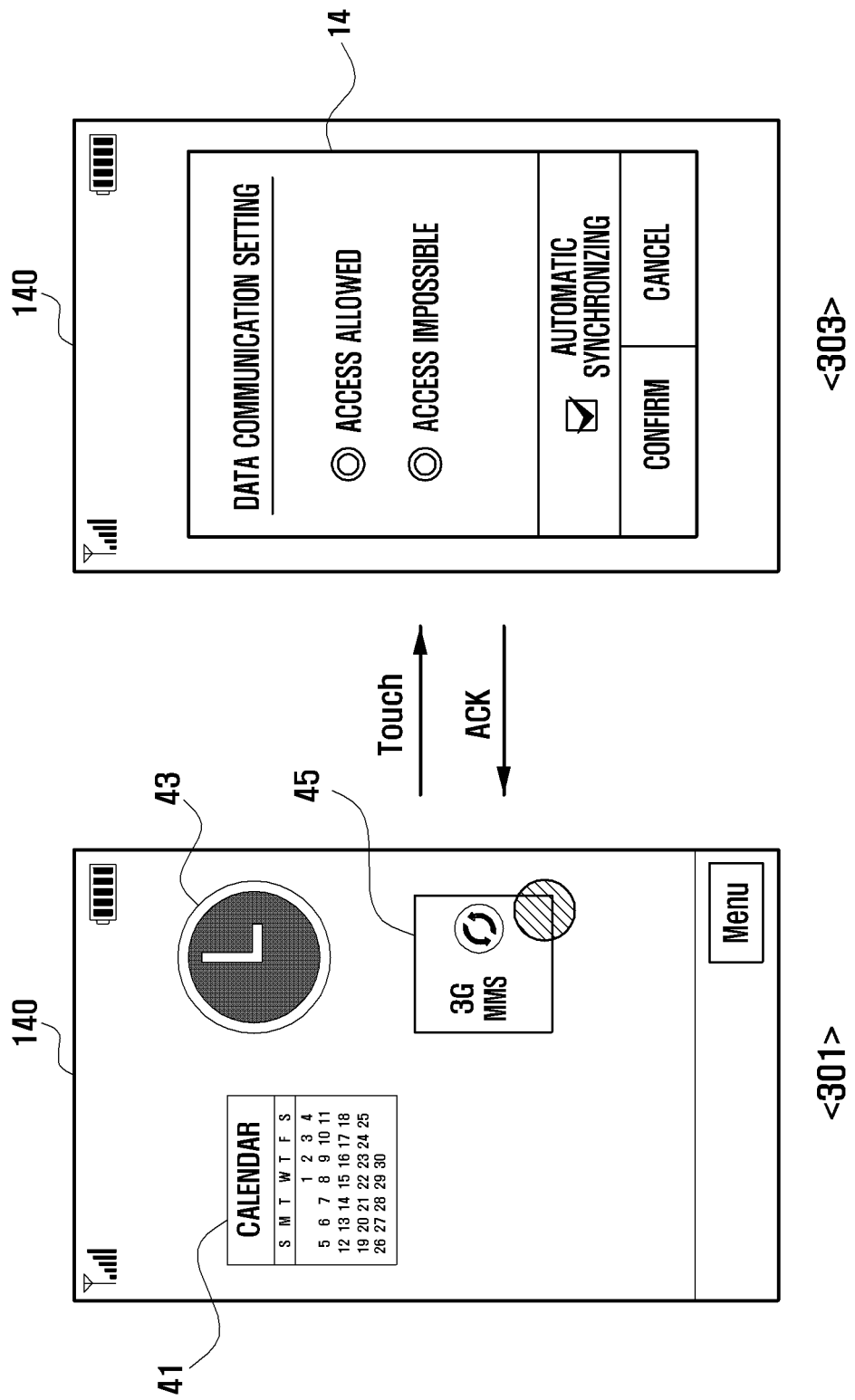
FIG. 3 is a view illustrating an example of a screen for describing communication setting control according to an exemplary embodiment of the present invention.

FIG. 3 is a view illustrating an example of a screen for describing an output and utilization of a user interface for changing a communication setting state according to an embodiment of the present invention.

Referring to FIG. 3, a mobile terminal 100 may output various widget icons and menu icons on an idle screen. For example, when a calendar widget 41, a clock widget 43, and a communication setting widget 45 are registered in schedule information, the mobile terminal 100 may output the calendar widget 41, the clock widget 43, and the communication setting widget 45 at designated locations as illustrated on a screen 301. Further, the mobile terminal 100 may output a menu icon to one side of a screen.

A user may touch a touch panel 143 region corresponding to a display panel 141 on which the communication setting widget 45 is output for changing or checking the communication setting state. The touch panel 143 then transfers a touch event corresponding to the touch to the controller 160. When a touch event for selecting the communication setting widget 45 is generated, the controller 160 may output a user interface 14 for checking and changing communication setting as shown in screen 303. The user interface 14 may output image buttons capable of determining data communication service access allowed data setting, data communication service access impossible state setting, activated or inactivated state setting of an automatic synchronizing function based on the mobile terminal 100.

A user may check a current communication setting state with respect to an activated state or an inactivated state as presented in user interface 14. Further, the user may check a setting selection or uncheck as current setting selection to change a communication setting state.

When a user selects the communication setting widget 45 in a screen 301 state, the mobile terminal 100 may check a current communication setting state before entering into a screen 303 and output a guide message corresponding thereto.

Figure 4:
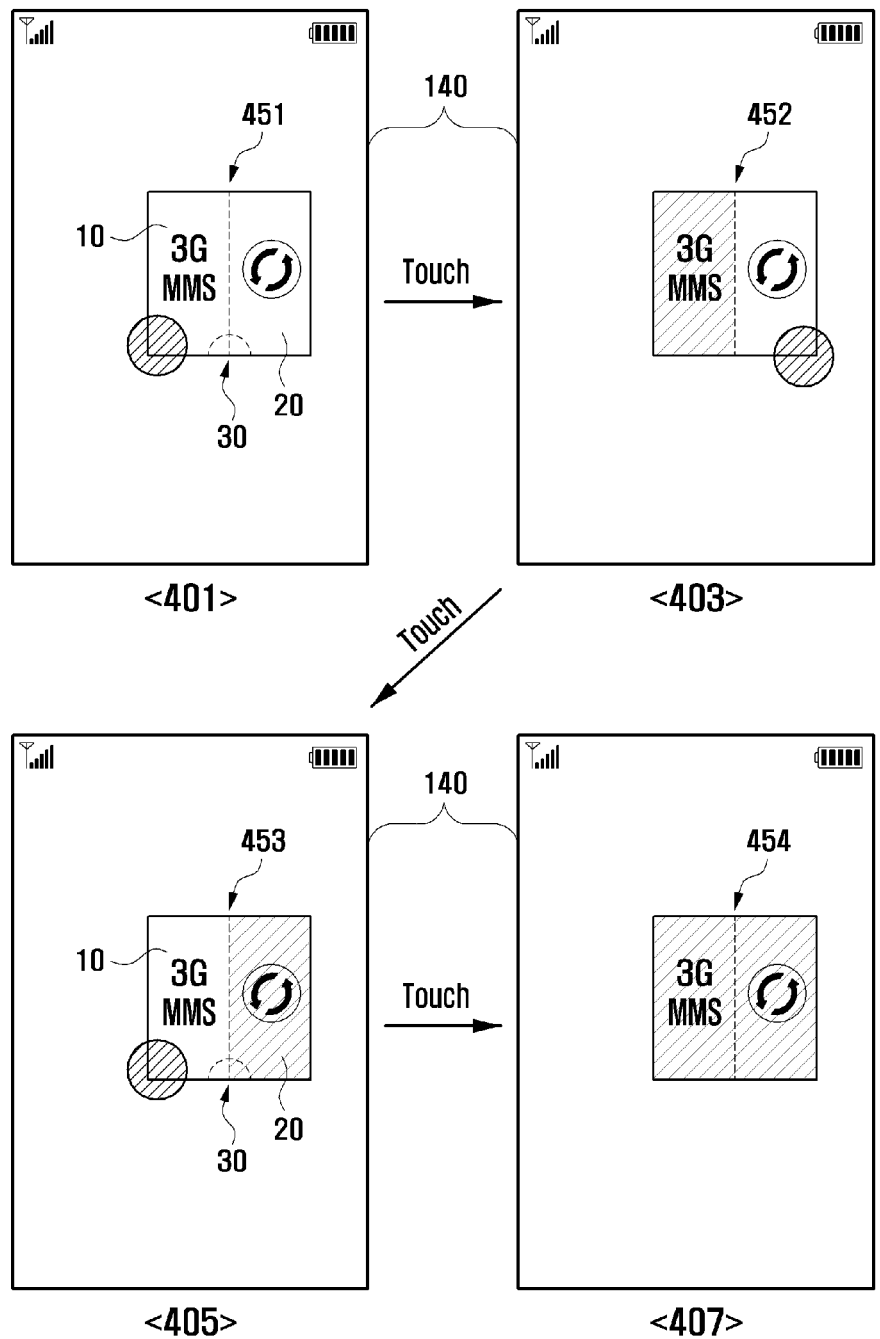
FIG. 4 is a view illustrating an example of a screen for describing communication setting control according to a second embodiment of the present invention.

FIG. 4 is a view illustrating an example of a screen for describing a change in a communication setting state according to an embodiment of the present invention and change of a communication setting widget according to a first embodiment.

In this case, the mobile terminal 100 may output various widgets and menu icons according to schedule information as illustrated previously. However, for convenience, the mobile terminal is described with reference to only a state that the communication setting widget 45 is output on the display unit 140.

Referring to FIG. 4, the mobile terminal 100 of the present invention may output a first communication setting widget 451 on a predetermined region of the display unit 140 (screen 401). To do this, the mobile terminal 100 may check a communication setting state that a user has previously set using communication setting state checking unit 161, and determine an image of a communication setting widget based on the communication setting state to output a first communication setting widget 451 on the display unit 140. For example, when the communication setting state information contains 3rd generation/Multi-Media Message service (3G/MMS) service access allowed state setting and automatic synchronizing function activation setting, the mobile terminal 100 may output an image instructing that two types of data communication function are activated.

Next, a user may create a touch event selecting a first communication setting widget 451 output on the display unit 140 to change a communication setting state. Accordingly, the mobile terminal 100 may control changing a communication setting change state, for example, 3G/MMS service access allowed setting to a data communication service access impossible setting state. Further, the mobile terminal 100 may output a second communication setting widget 452 corresponding to a changed state on the display unit 140.

Next, a user may create a touch event selecting a second communication setting widget 452 in a screen 403 state to change to another communication setting state. Accordingly, the mobile terminal 100 may control changing a certain communication setting change state, for example, a data communication service access impossible setting state to a data communication service access allowed setting state. Further, the mobile terminal 100 may change an automatic synchronizing function from an active state to an inactive state. Simultaneously, the mobile terminal 100 may control the display unit 140 to output a third communication setting widget 453 corresponding to a data communication service access allowed setting state and an automatic synchronizing inactivation state.

Further, a user may create a touch event (represented by the hashed circle) selecting a third communication setting widget 453 in a screen 405 state to change to another communication setting state. Accordingly, the mobile terminal 100 may control change of a communication setting change state, for example, a data communication service access allowed setting state to a data communication service access impossible setting state. Moreover, the mobile terminal 100 may control maintenance of an inactive state of an automatic synchronizing function. Simultaneously, the mobile terminal 100 may control a display unit 140 to display a fourth communication setting widget 454 corresponding to a data communication service access impossible setting state and an inactive state of an automatic synchronization (screen 405). In addition, an input signal for selecting an additional communication setting widget may be generated, and the mobile terminal 100 may return to a screen 401.

The foregoing embodiment has been described with regard to a communication setting state changing in a toggle scheme regardless of a location on the communication setting widget in which a touch event occurs. However, the present invention is not limited thereto.

That is, the mobile terminal 100 may divide a region of the communication setting widgets output on the display unit 140 into two regions, and a data communication service access allowed state setting region 10 and an automatic synchronizing activation setting region 20. Accordingly, the mobile terminal 100 may support processing as a user changes setting corresponding to a region generating a touch event among communication setting widgets. Thus, when a user touches a 3G/MMS region 10 as presented by the hashed circle) determining presence of a data communication service access possibility among a first communication setting widget 451 regions from a screen 401, the mobile terminal 100 may output a second communication setting widget 452 (screen 403) and control the change of only a communication allowed setting state of a corresponding region. Further, when the user touches the second region (i.e., arrow region) 20 of the first communication setting widget 451 region, the mobile terminal 100 may output a third communication setting widget 453 (screen 405) and control the change of only an automatic synchronizing function activation region of a corresponding region. Further, when a user touches a center part 30 of the first communication setting widget 451 to generate a touch event selecting both of two regions 10 and 20, the mobile terminal 100 may output a fourth communication setting widget 454 (screen 407) and control data communication service access allowed setting and change in an automatic synchronizing function activation state at the same time.

Further, if an input signal selecting a first communication setting widget (screen 401) is detected, the mobile terminal 100 may output a communication setting state guide message corresponding to a first communication setting widget 451. Further, when a second communication setting widget 452 is output on the display unit 140 (screen 403) is detected, the mobile terminal 100 may output a communication setting state guide message corresponding to a second communication setting widget 452. In the same manner, the mobile terminal 100 may output a guide message corresponding to a third communication setting widget 453 and a guide message corresponding to a fourth communication setting widget 454 according to the detection of an input signal and display of the display unit 140.

Thus, the mobile terminal 100 according to an embodiment of the present invention may display a variety of a communication setting widgets according to a communication setting state and change the communication setting state based on detection of an input unit selecting a corresponding communication setting widget.

Figure 5:
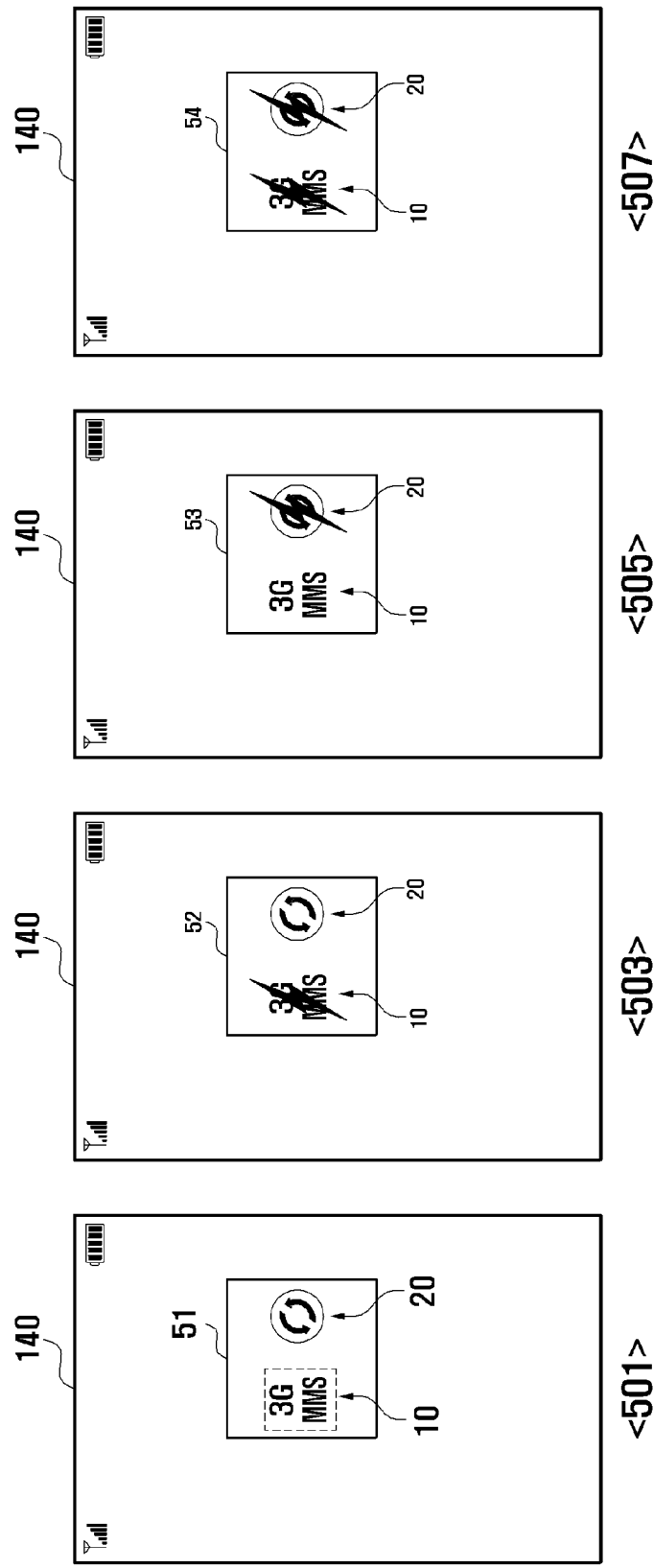
FIG. 5 is a view illustrating an example of a screen for describing change in a communication setting widget according to a second embodiment of the present invention.

FIG. 5 is a view illustrating an example of a screen for describing another form of a communication setting widget according to a second embodiment of the present invention.

Referring to FIG. 5, the mobile terminal 100 may output a communication setting widget corresponding to a communication setting state based on the communication setting state information stored in a data area (screen 501). When a current communication setting state is a 3G/MMS data communication based data communication service access allowed setting state and an automatic synchronizing function activation state automatically exchanging a data packet in a predetermined period, the mobile terminal 100 may output a communication setting widget 51.

When the current communication setting state is a data communication service access impossible setting state, or changes from a data communication service access allowed setting state to a data communication service access impossible setting state, or an automatic synchronizing function activation state, the mobile terminal 100 may output a communication setting widget 52 as illustrated in screen 503. In this case, the mobile terminal 100 overlays region 10 with and image, for example, "lightning" image, and displays the overlayed result, thereby indicating a data communication service access impossible state. Here, because different types of images may be used to indicate a non-allowance or a stop condition, the "lightning" image illustrated here is only to describe the processing and the image may be easily changed to other images (e.g., "X"). Accordingly, the present invention is not limited to the "lightning" image illustrated in screen 503.

When a current communication setting state is an inactive state of an automatic synchronizing function or a data communication service access allowed setting state in a case where the automatic synchronizing function changes from an inactive state to an active state, the mobile terminal 100 may output a communication setting widget 53 (screen 505). That is, the mobile terminal 100 overlays circle region 30 with a certain image, for example, "lightning" image, and displays the over-layed result. Thus, indicating an inactivate state of the automatic synchronizing function.

Finally, when the current communication setting state is a data communication service access impossible setting state or an inactive state or an active state of an automatic synchronizing function in a case where a data communication service access allowed setting state changes to an impossible setting state, the mobile terminal may output a communication setting widget 54 (screen 507). That is, the mobile terminal 100 overlays region 10 (i.e., a 3G/MMS) with an image, for example, "lightning" image, and region 20 with an image (i.e., an arrow) and displays the over-layed result. Thus, the display indicates a data communication service access impossible state and an automatic synchronizing inactivation state.

As illustrated above, the mobile terminal 100 according to an embodiment of the present invention displays a certain image at a specific location of a communication setting widget to display a use possible or impossible state of a data communication function in a communication setting widget such that a user may easily determine and confirm a communication setting state.

Figure 6:
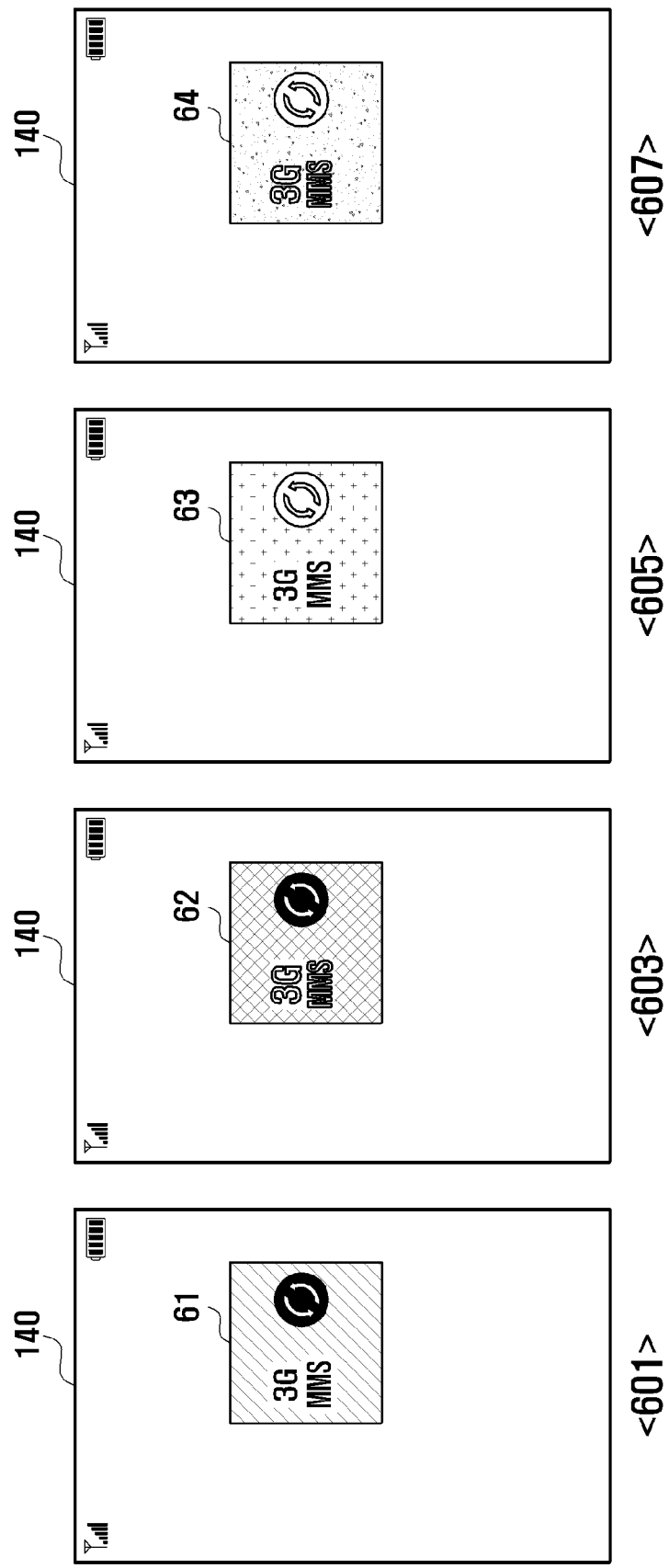
FIG. 6 is a view illustrating an example of a screen for describing a change in a communication setting widget according to a third embodiment of the present invention.

FIG. 6 is a view illustrating an example of a screen for describing another form of a communication setting widget according to a third embodiment of the present invention.

Referring to FIG. 6, the mobile terminal 100 may output a communication setting widget 61 as in screen 601), a communication setting widget 62 as in screen 603), a communication setting widget 63 as in the screen 605, or a communication setting widget 64 as in the screen 607 according to a communication setting state in order to distinguish four communication setting states. Here, as shown, the communication setting widgets 61, 62, 63, and 64 may be supported such that a user may recognize a current communication setting state with only a background color of a communication setting widget by varying a background color of each sign (as represented by different hashing indications). Further, the mobile terminal 100 may operate such that a user may more intuitively understand a current communication setting state by using different colors for respective signs according to a corresponding communication setting state.

The foregoing embodiment has illustrated respective constructions of a mobile terminal supporting communication setting control, roles of respective constructions, a communication setting widget for communication setting control, and communication setting change based thereon according to an embodiment of the present invention.

Hereinafter, a method for controlling communication setting operated by the foregoing mobile terminal will be described with reference to drawings in detail.

Figure 7:
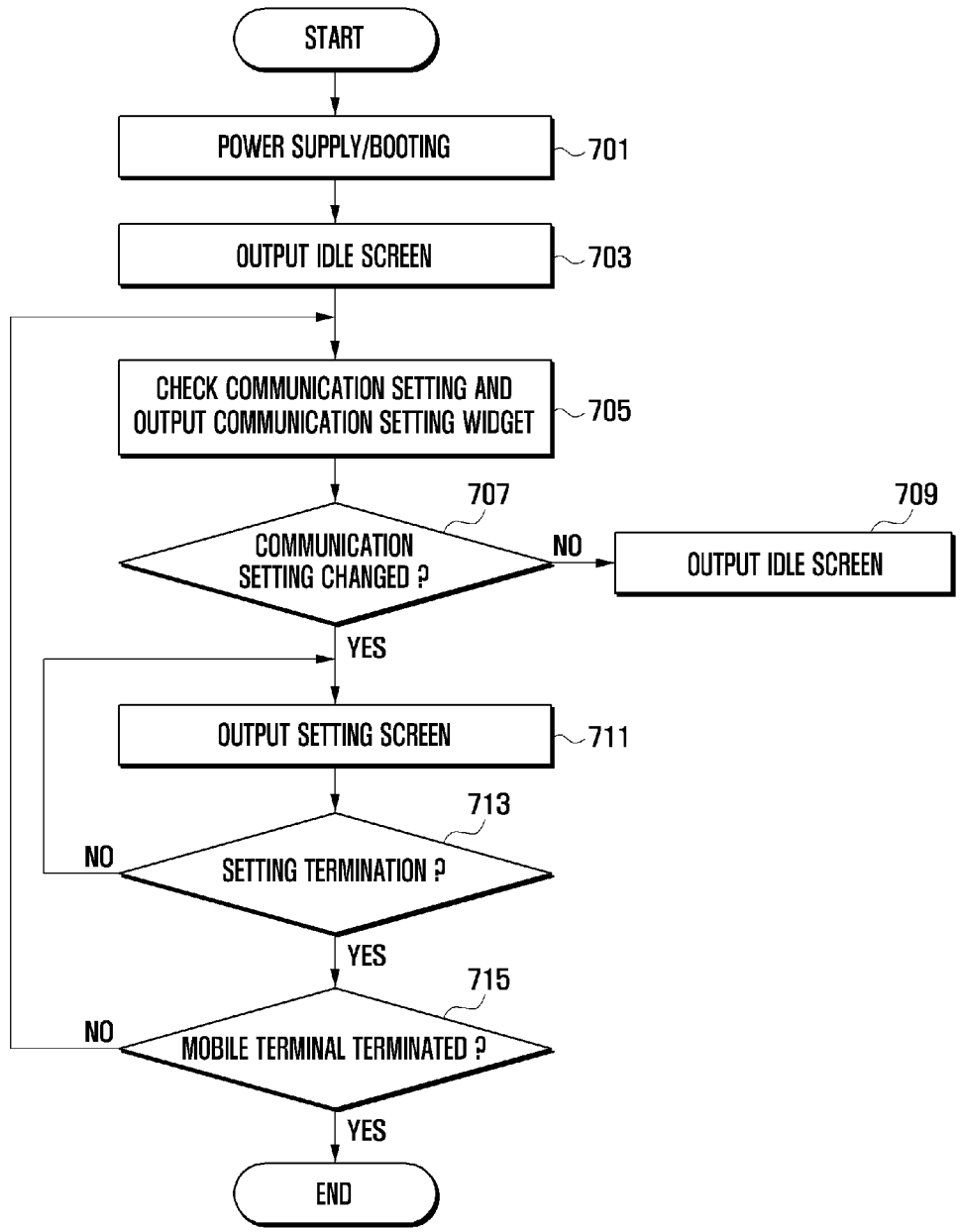
FIG. 7 is a flowchart illustrating a method for controlling communication setting according to an exemplary embodiment of the present invention.

FIG. 7 is a flowchart illustrating a method for control communication setting of a mobile terminal according to an embodiment of the present invention.

Referring to FIG. 7, a user firstly controls the application of power supplied to mobile terminal 100. For example, a user may connect a battery or a charger of the mobile terminal 100 and generate an input signal for providing power to the terminal (i.e., on button). The supplied power is sufficient to allow operation of respective constructions and initializes the respective constructions to perform a booting or startup operation (701).

After the booting process is complete, the mobile terminal 100 may control display unit 140 to output an idle screen according to preset schedule information (703). Further, the mobile terminal 100 may control the display unit 140 to display a preset widget and a menu icon on the display unit 140 on which the idle screen is output. The mobile terminal 100 may further check a communication setting of the mobile terminal 100 and control the display unit 140 to output a communication setting widget according to the current communication setting (705). In this case, the mobile terminal 100 checks whether preset communication setting state information input by a user is included in the memory 150. When the preset communication setting state information is included in the memory 150, the mobile terminal 100 may output of a communication setting widget corresponding to the communication setting state information. When the preset communication setting state information is not included in the memory 150, the mobile terminal 100 may output a default set communication setting widget. The default set communication setting widget may be a widget corresponding to the communication setting state set by a designer in a manufacturing procedure.

Next, the mobile terminal 100 determines whether an input signal for changing communication setting is generated (707). That is, the mobile terminal 100 determines whether an input signal of an input unit 120 for selecting a communication setting widget 45 output on the display unit 140 or a touch event from the display unit 140 is generated. In this procedure, when the generated input signal or touch event is not a signal selecting a communication setting widget 45, the mobile terminal 100 may control execution of a corresponding function according to the input signal. For example, the mobile terminal 100 may control execution of a call function, a file playback function, a file searching function, a broadcasting receiving function, and a camera function according to the input signal or touch event.

However, when the generated input signal is a signal for changing communication setting at step 707, the mobile terminal 100 may control the output of a setting screen (711). That is, the mobile terminal 100 may output a setting screen corresponding to a user interface illustrated in FIG. 3 on the display unit 140. Subsequently, the mobile terminal 100 determines whether a signal for instructing setting termination is generated (713). When the signal for instructing setting termination is not generated, the process may go to step 711. Here, step 711 and step 713 may be omitted from a method for controlling communication setting of the present invention. That is, a method for controlling communication setting of the present invention may change to a certain communication setting state in a toggle scheme according to generation of a signal for changing communication setting without a separate setting screen output as illustrated previously.

However, if the signal for instructing setting termination is generated and detected, the mobile terminal 100 determines whether an input signal for terminating a function of the mobile terminal 100 is generated (715). If the input signal for terminating a function of the mobile terminal 100 is not generated, the mobile terminal 100 may control execution of changing a communication setting state (705).

As illustrated above, when a communication setting widget corresponding to communication setting is output and a user generates an input signal selecting a corresponding communication setting widget, a method for controlling communication setting of the mobile terminal according to an embodiment of the present invention may control the change to another communication setting state. In this procedure, the mobile terminal may support a guide message output function corresponding to a current communication setting widget output on a display unit, and support output of a setting screen for checking and changing communication setting on the display unit.

Meanwhile, the foregoing embodiment has been described with regard to an RF unit 110 that a communication channel with a server based on a 3G network by way of example. However, the present invention is not limited thereto. That is, communication setting change of the present invention is not limited to characteristics of a network accessing by an RF unit 110 but supports various data communication functions capable of being performed based on other communication modules such that a user selectively and easily may activate or inactivate a part of corresponding functions. In particular, upon accessing a network to which billing is applied, a communication setting change function of the present invention controls activation of a part of all of data communication functions according to tastes or environment of a user to support suitable data communication function operation.

The above-described methods according to the present invention can be realized in hardware or as software or computer code that can be stored in a recording medium such as a CD, a ROM, an RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein. As would be recognized by those skilled in the art, when a general purpose computer is loaded with, or accesses, software or code for implementing the processing shown herein, the general purpose computer is transformed into a special purpose computer that may at least perform the processing shown herein.

The foregoing mobile terminal 100 may further include various additional modules according to provision forms. That is, when the mobile terminal 100 is a communication terminal, it may include constructions that are not mentioned, such as a near distance communication module for near distance communication, an interface exchanging data in a wired communication scheme or a wireless communication scheme of the mobile terminal 100, an Internet communication module communicating with an Internet to perform an Internet function, and a digital broadcasting module receiving and broadcasting digital broadcastings. Since the structural elements can be changed according to convergence trend of a digital device, no elements can be listed. However, the portable terminal 100 may include structural elements equivalent to the foregoing structural elements. Further, the terminal 100 of the present invention may be substituted by specific constructions in the foregoing arrangements according to the provided form or another structure. This can be easily understood to those skilled in the present art.

Further, the mobile terminal 100 according to an embodiment of the present invention may include various types of devices having a communication module capable of performing data communication. For example, the mobile terminal 100 may include an information communication device and a multimedia device such as a Portable Multimedia Player (PMP), a digital broadcasting player, a Personal Digital Assistant (PDA), a music player (e.g., MP3 player), a portable game terminal, a Smart Phone, a notebook computer, and a handheld PC as well as various mobile communication terminals corresponding to various communication systems.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A method, operable by a processor in a mobile terminal, for controlling communication setting of the mobile terminal, the method comprising:
   outputting a communication setting widget indicating current operational state of at least one data communication function of the mobile terminal;
   receiving a touch input, for changing an operational state of the at least one data communication function, on a portion of the communication setting widget; and
   changing the operational state of the corresponding data communication function in response to the touch input,
   wherein, when the corresponding data communication function is an automatic synchronizing function, changing the operational states comprises one of:
   changing an active state of an automatic synchronizing function to an inactive state; and
   changing an inactive state of an automatic synchronizing function to the active state.

2. The method of claim 1, further comprising:
   outputting a guide message guiding a communication setting state according to a corresponding communication setting widget when the touch input signal is generated.

3. The method of claim 1, wherein, when the corresponding data communication function is packet data communication service of cellular communication system, changing operational state comprises one of:
   changing the packet data communication service allowed setting to the packet data communication service unallowed setting; and
   changing the packet data communication service unallowed setting to the packet data communication service allowed setting.

4. The method of claim 1, wherein further comprising:
   changing the communication setting widget according to the change in the communication setting.

5. The method of claim 4, wherein changing the communication setting widget comprises at least one of:
   changing a background color of the communication setting widget;
   changing a color of a sign included in the communication setting widget;
   overlaying a certain image on a sign included in the communication setting widget; and
   removing the overlayed certain image according to the change in the communication setting.

6. The method of claim 4, further comprising:
   outputting a guide message guiding a communication setting state according to a changed communication setting widget when the communication setting widget changes.

7. The method of claim 1, wherein outputting a communication setting widget comprises:
   outputting a region indicating at least one of an allowed state of a data communication service and an unallowed state of a data communication service; and
   outputting a region indicating at least one of the active state and the inactive state of the automatic synchronizing function.

8. The method of claim 7, wherein changing operational state comprises:
- changing a setting state of a function when a corresponding region is activated by the touch input; and
- changing setting states of corresponding functions when the touch input selecting both regions is generated.

9. The method of claim 7, wherein changing the communication setting widget comprises:
- changing an image of a region activated by the touch input according to change in a communication setting state; and
- changing setting states of the corresponding functions according to the change in a communication setting state when the touch input selecting two regions is generated.

10. The method of claim 1, further comprising:
outputting a communication setting screen when the touch input selecting the communication setting widget is generated.

11. The method of claim 10, wherein outputting a communication setting screen comprises:
- outputting a region for setting an allowed state or an unallowed state of a data communication service; and
- outputting a region for setting an active state or an inactive state of an automatic synchronizing function.

12. The method of claim 11, wherein outputting a communication setting screen comprises:
- outputting setting information about the allowed state or the unallowed state of the data communication service corresponding to a current communication setting state; and
- outputting information about the active state or the inactive state of the automatic synchronizing function corresponding to a current communication setting state.

13. A mobile terminal supporting communication setting state control, the terminal comprising:
- a radio frequency unit forming a communication channel for data communication and forming a communication channel to an automatic synchronizing function;
- a display unit outputting a communication setting widget indicating an operational state of the data communication service and the automatic synchronizing function, wherein the operational state of the data communication service is changed between: an allowed state and an unallowed state, and the operational state of the automatic synchronization function is changed between: an active state and an inactive state; and
- a controller controlling a change in the operational state of at least one of the data communication service and the automatic synchronizing function in response to a touch input generated on a portion of the communication setting widget having at least one of a widget indicating the operational state of the data communication service and a widget indicating the operational state of the automatic synchronizing function.

14. The mobile terminal of claim 13, further comprising:
an audio processing unit outputting a guide message guiding a communication setting state according to a corresponding communication setting widget when the communication setting widget is selected.

15. The mobile terminal of claim 13, wherein the controller controls change and output of an image of the communication setting widget according to change in the communication setting on the display unit.

16. The mobile terminal of claim 14, wherein the controller controls at least one of:
- a change in a background color of the communication setting widget to change the image of the communication setting widget;
- a change in a color of a sign included in the communication setting widget;
- incorporation of a certain image overlayed on a part of the image of the communication setting widget; and
- removal of the overlayed certain image.

17. The mobile terminal of claim 13, wherein the communication setting widget comprises:
- a region indicating the operational state of the data communication service; and
- a region indicating the operational state of the automatic synchronizing function.

18. The mobile terminal of claim 17, further comprising:
an input unit or a touch screen generating the touch input wherein the controller:
- changes only a communication setting state corresponding to the region when the touch input selecting one of the two regions is generated,
- changes an image of a communication setting widget according to change in a communication setting state,
- changes both of the communication setting states corresponding to the two regions when the touch input selection for both of the two regions is generated, and
- changes a communication setting widget image according to change in a communication setting state.

19. The mobile terminal of claim 13, wherein the display unit outputs a communication setting screen for changing the operational state of the data communication service and the operational state of the automatic synchronizing function when the touch input selecting the communication setting widget is generated.

20. The mobile terminal of claim 19, wherein the communication setting screen outputs information about a current communication setting state.

21. A method, operable by a processor in a mobile terminal, for controlling communication setting of the mobile terminal, the method comprising:
- outputting at least one communication setting widget indicating current operational state of at least one data communication function of the mobile terminal;
- receiving a touch input on a portion of the at least one communication setting widget for changing an operational state of the at least one data communication function; and
- visibly displaying a change in the operational state of the corresponding data communication function in response to the touch input,
- wherein, when the corresponding data communication function is an automatic synchronizing function, visibly displaying a change in the operational state comprises one of:
  - changing an active state of an automatic synchronizing function to an inactive state; and
  - changing an inactive state of an automatic synchronizing function to the active state, and
- wherein, when the corresponding data communication function is packet data communication service, visibly displaying a change in the operational state comprises one of:
  - changing the packet data communication service allowed setting to the packet data communication service unallowed setting; and changing the packet data communication service unallowed setting to the packet data communication service allowed setting.

\* \* \* \* \*

UNITED STATES PATENT AND TRADEMARK OFFICE
CERTIFICATE OF CORRECTION

PATENT NO.       : 8,588,859 B2  
APPLICATION NO.  : 13/206824  
DATED            : November 19, 2013  
INVENTOR(S)      : Kim et al.

Page 1 of 1

It is certified that error appears in the above-identified patent and that said Letters Patent is hereby corrected as shown below:

In the Claims

Column 14, Claim 2, Line 31 should read as follows:  
--...touch input is generated...--

Signed and Sealed this  
Eleventh Day of March, 2014

Michelle K. Lee  
*Deputy Director of the United States Patent and Trademark Office*